US009451523B2

(12) United States Patent
Kim et al.

(10) Patent No.: US 9,451,523 B2
(45) Date of Patent: Sep. 20, 2016

(54) METHOD AND APPARATUS FOR MANAGING PACKET IN SYSTEM SUPPORTING NETWORK CODING

(71) Applicant: Samsung Electronics Co., Ltd., Gyeonggi-do (KR)

(72) Inventors: Suk-Won Kim, Gyeonggi-do (KR); Jung-Soo Jung, Gyeonggi-do (KR); Hyun-Jeong Kang, Seoul (KR); Young-Bin Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 14/261,306

(22) Filed: Apr. 24, 2014

(65) Prior Publication Data

US 2014/0321354 A1 Oct. 30, 2014

(30) Foreign Application Priority Data

Apr. 24, 2013 (KR) .................. 10-2013-0045453

(51) Int. Cl.
| | | |
|---|---|---|
| *H04B 7/14* | (2006.01) | |
| *H04W 40/00* | (2009.01) | |
| *H04L 12/861* | (2013.01) | |
| *H04L 1/00* | (2006.01) | |
| *H04L 1/18* | (2006.01) | |
| *H04B 7/155* | (2006.01) | |

(52) U.S. Cl.
CPC .......... *H04W 40/00* (2013.01); *H04B 7/15521* (2013.01); *H04L 1/00* (2013.01); *H04L 1/1877* (2013.01); *H04L 1/1887* (2013.01); *H04L 49/9005* (2013.01); *H04L 2001/0097* (2013.01)

(58) Field of Classification Search
USPC .................................. 370/315, 328
See application file for complete search history.

(56) References Cited

U.S. PATENT DOCUMENTS

| | | | |
|---|---|---|---|
| 2008/0085709 A1* | 4/2008 | Jeon .................... | H04B 7/15521 455/436 |
| 2009/0086666 A1* | 4/2009 | Guvenc .................. | H04B 7/155 370/328 |
| 2010/0124186 A1 | 5/2010 | Josiam et al. | |
| 2010/0220644 A1* | 9/2010 | Reznik ............... | H04B 7/15521 370/315 |
| 2010/0248729 A1* | 9/2010 | Yu ........................ | H04B 7/0854 455/450 |
| 2011/0142013 A1 | 6/2011 | Manssour et al. | |
| 2012/0230409 A1 | 9/2012 | Chen et al. | |
| 2012/0263100 A1 | 10/2012 | Yuan et al. | |

OTHER PUBLICATIONS

International Search Report dated Jul. 30, 2014 in connection with International Patent Application No. PCT/KR2014/003539, 3 pages.
Written Opinion of the International Searching Authority dated Jul. 30, 2014 in connection with International Patent Application No. PCT/KR2014/003539, 5 pages.

* cited by examiner

*Primary Examiner* — Phuongchau Ba Nguyen

(57) ABSTRACT

A method for managing a packet in a system supporting network coding includes receiving, from a relay, information on a packet to which the network coding is applied, receiving, from the relay, the packet to which the network coding is applied, confirming whether a packet required for an operation of the UE can be acquired from the received packet on the basis of information on the packet to which the network coding is applied, and storing packets into different buffers by distinguishing between the packet required for the operation of the UE and a packet not required for the operation of the UE. Other embodiments including an apparatus for managing a packet are also disclosed.

16 Claims, 12 Drawing Sheets

METHOD AND APPARATUS FOR MANAGING PACKET IN SYSTEM SUPPORTING NETWORK CODING

CROSS-REFERENCE TO RELATED APPLICATION AND CLAIM OF PRIORITY

The present application is related to and claims the benefit under 35 U.S.C. §119(a) of a Korean patent application No. 10-2013-0045453 filed in the Korean Intellectual Property Office on Apr. 24, 2013, the entire disclosure of which is hereby incorporated by reference.

TECHNICAL FIELD

The present disclosure relates to a system supporting network coding. More particularly, the present disclosure relates to a method and apparatus for managing a packet in a User Equipment (UE).

BACKGROUND

A communication system using a relay is actively under research to improve communication efficiency. For example, a system for delivering a signal by using the relay is researched and developed to solve a situation in which a User Equipment (UE) cannot receive a service when located outside a coverage area of a Base Station (BS) or when located in a shadowing zone.

Conventionally, the relay performs a function of simply storing data received from a source node in a network and thereafter delivering the stored data to a destination node. However, in order to effectively use a network resource and to improve transmission efficiency, a network coding scheme has recently been proposed in which a plurality of pieces of data received from a plurality of source nodes are encoded together and are transmitted to a plurality of destination nodes. For example, as illustrated in FIG. 1, instead of directly transmitting data x received from a UE #1 101 and data y received from a UE #2 102, a relay 110 encodes the data x and y by using an eXclusive OR (XOR) operation and thereafter transmits encoded data x⊕y to the UE #1 101 and the UE #2 102. In addition, instead of directly transmitting data w received from a UE #3 103 and data z received from a UE #4 104, the relay 110 encodes the data w and z by using the XOR operation and thereafter transmits encoded data z⊕w to the UE #103 and the UE #4 104.

As such, when using the network coding scheme, each UE may extract desired data on the basis of data retained in each UE from data received from a network. For example, as illustrated in FIG. 1, when the UE #1 101 receives the encoded data x⊕y from the relay, since the data x is pre-known, the data y may be extracted from the encoded data x⊕y on the basis of the data x.

However, since data encoded using the network coding scheme is determined according to a scheduling scheme used in the relay, even if the UE receives encoded data including desired data, there may be a case where the desired data cannot be extracted when all other pieces of data encoded together are not known, and also there may be a case where encoding data not including the desired data is received. In this case, the UE needs to persistently wait until data which is decodable with data retained in the UE and which includes desired data is received.

SUMMARY

To address the above-discussed deficiencies, it is a primary object to provide a method and apparatus in which a User Equipment (UE) manages a packet in a system supporting network coding.

Another aspect of the present disclosure is to provide a method and apparatus in which a UE stores a received packet in a distinctive manner in a system supporting network coding.

Another aspect of the present disclosure is to provide a method and apparatus in which a UE extracts an undesired packet from a received decodable packet and stores the extracted undesired packet into a separate buffer in a system supporting network coding.

Another aspect of the present disclosure is to provide a method and apparatus in which a UE classifies a received non-decodable packet and stores the received non-decodable packet into a separate buffer in a system supporting network coding.

Another aspect of the present disclosure is to provide a method and apparatus in which a UE includes an original buffer for storing a transmitted/received packet and additionally includes a buffer for storing a Decodable but Undesirable Packet (DUP) and a buffer for storing a Not decodable and Undesirable Packet (NUP) in a system supporting network coding.

Another aspect of the present disclosure is to provide a method and apparatus in which a relay transmits information of a packet to which network coding is applied in a system supporting the network coding.

Another aspect of the present disclosure is to provide a method and apparatus in which a UE discards a packet stored in a buffer on the basis of packet information received from a relay in a system supporting network coding.

In accordance with an aspect of the present disclosure, a method in which a UE manages a packet in a system supporting network coding is provided. The method includes receiving, from a relay, information on a packet to which the network coding is applied, receiving, from the relay, the packet to which the network coding is applied, confirming whether a packet required for an operation of the UE can be acquired from the received packet on the basis of information on the packet to which the network coding is applied, and storing packets into different buffers by distinguishing between the packet required for the operation of the UE and a packet not required for the operation of the UE.

In accordance with another aspect of the present disclosure, an apparatus of a UE for managing a packet in a system supporting network coding is provided. The apparatus includes a receiver for receiving, from a relay, information on a packet to which the network coding is applied and the packet to which the network coding is applied, a controller for confirming whether a packet required for an operation of the UE can be acquired from the received packet on the basis of information on the packet to which the network coding is applied, and a memory for storing packets under the control of the controller into different buffers by distinguishing between the packet required for the operation of the UE and a packet not required for the operation of the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
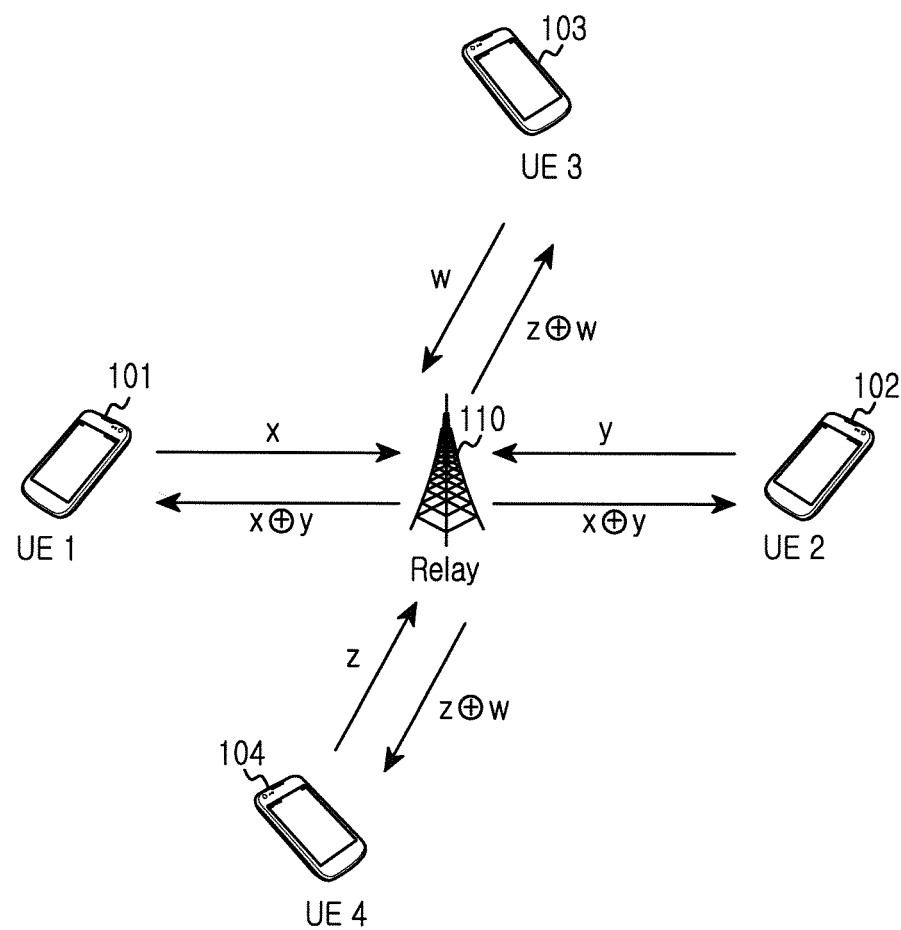
FIG. 1 illustrates an example of a conventional system supporting network coding.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein.

Hereinafter, a method and apparatus in which a User Equipment (UE) manages a packet in a system supporting network coding will be described according to an exemplary embodiment of the present disclosure. A relay described hereinafter implies a relay node for performing a function of transmitting a packet received from a node constituting a network to another node. The relay can be a Base Station (BS). For convenience of explanation, a packet generated by the relay by applying a random manipulation to packets of different UEs is hereinafter called a Network Coding (NC) packet. Herein, the random manipulation applied to the packets of the different UEs can be an eXclusive OR (XOR) operation, an addition operation, a multiplication operation, a linear operation, or a nonlinear operation. For example, if the relay generates $P1 \oplus P2 \oplus P3$ by applying the XOR operation to a packet P1 received from a UE 1, a packet P2 received from a UE 2, and a packet P3 received from a UE 3, the generated packet $P1 \oplus P2 \oplus P3$ is called an NC packet.

In the embodiment of the present disclosure, upon receiving a decodable NC packet from a relay, a UE can extract a desired packet from the received NC packet, and can store the extracted packet into an original buffer. Herein, the desired packet implies a packet required for an operation (e.g., transmission/reception) of the UE.

In addition, in the embodiment of the present disclosure, upon receiving the decodable NC packet from the relay, the UE can extract an undesired packet, and can store the extracted packet into a Decodable but Undesirable Packet (DUP) buffer additionally provided in addition to the original buffer. Herein, the undesired packet implies a packet not required for the operation (e.g., transmission/reception) of the UE.

In addition, in the embodiment of the present disclosure, upon receiving a non-decodable NC packet from the relay, the UE can store the received NC packet into a Not decodable and Undesirable Packet (NUP) buffer additionally provided in addition to the original buffer. In addition, the non-decodable NC packet can be a packet encoded by applying a random manipulation to desired packets and undesired packets, or can be a packet encoded by applying the random manipulation to the undesired packets.

Figure 2A:
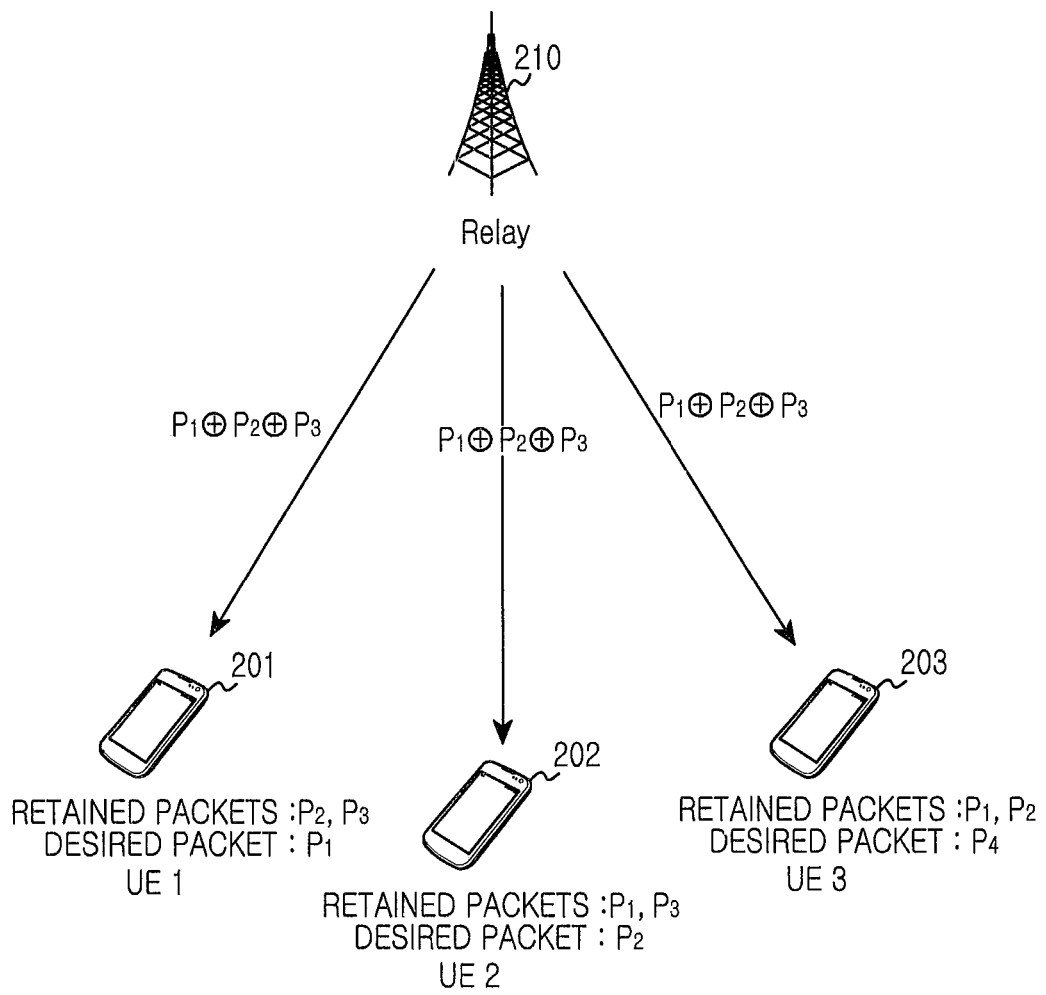
FIG. 2A and FIG. 2B illustrate an example in which a User Equipment (UE) acquires a desired packet by using a Decodable but Undesirable Packet (DUP) in a system supporting network coding according to an embodiment of the present disclosure.
Figure 2B:
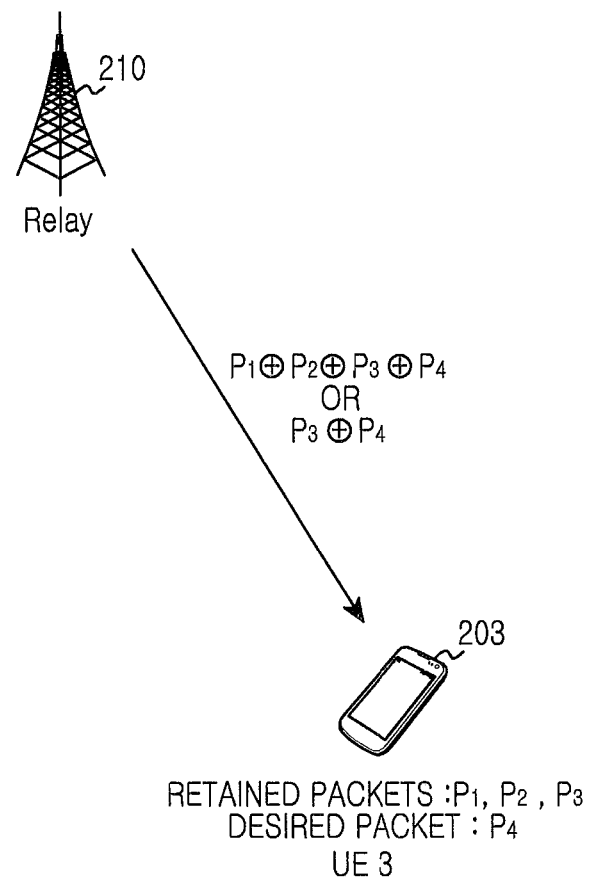

FIG. 2A and FIG. 2B illustrate an example in which a UE acquires a desired packet by using a DUP in a system supporting network coding, according to an embodiment of the present disclosure.

As illustrated in FIG. 2A, it is assumed a case where a UE #1 201 retains packets P2 and P3 and requires a packet P1, a UE #2 202 retains packets P1 and P3 and requires a packet P2, and a UE #3 203 retains packets P1 and P2 and requires a packet P4. In this case, a relay 210 can generate $P1 \oplus P2 \oplus P3$ by applying an XOR operation to the packets P1, P2, and P3, and can broadcast the generated NC packets $P1 \oplus P2 \oplus P3$. In this case, the UE #1 201 can extract the desired packet P1 from the received NC packet on the basis of the retained packets P2 and P3, and can store the extracted packet P1 into an original buffer. In addition, the UE #2 202 can extract the desired packet P2 from the received NC packet on the basis of the retained packets P1 and P3, and can store the extracted packet P2 into an original buffer. On the other hand, the UE #3 203 can extract the undesired packet P3 from the received NC packet on the basis of the retained packets P1 and P2. In this case, although the undesired packet P3 is not required for the operation of the UE #3 203 at a current time, the UE #3 203 can store the packet P3 into a DUP buffer instead of discarding the packet. This is because, as illustrated in FIG. 2B, if an NC packet P1⊕P2⊕P3⊕P4 or P3⊕P4 is received from the relay 210 or any other relays at a later time, a desired packet P4 can be extracted from the received NC packet by using packets P1, P2, and P3.

Figure 3A:
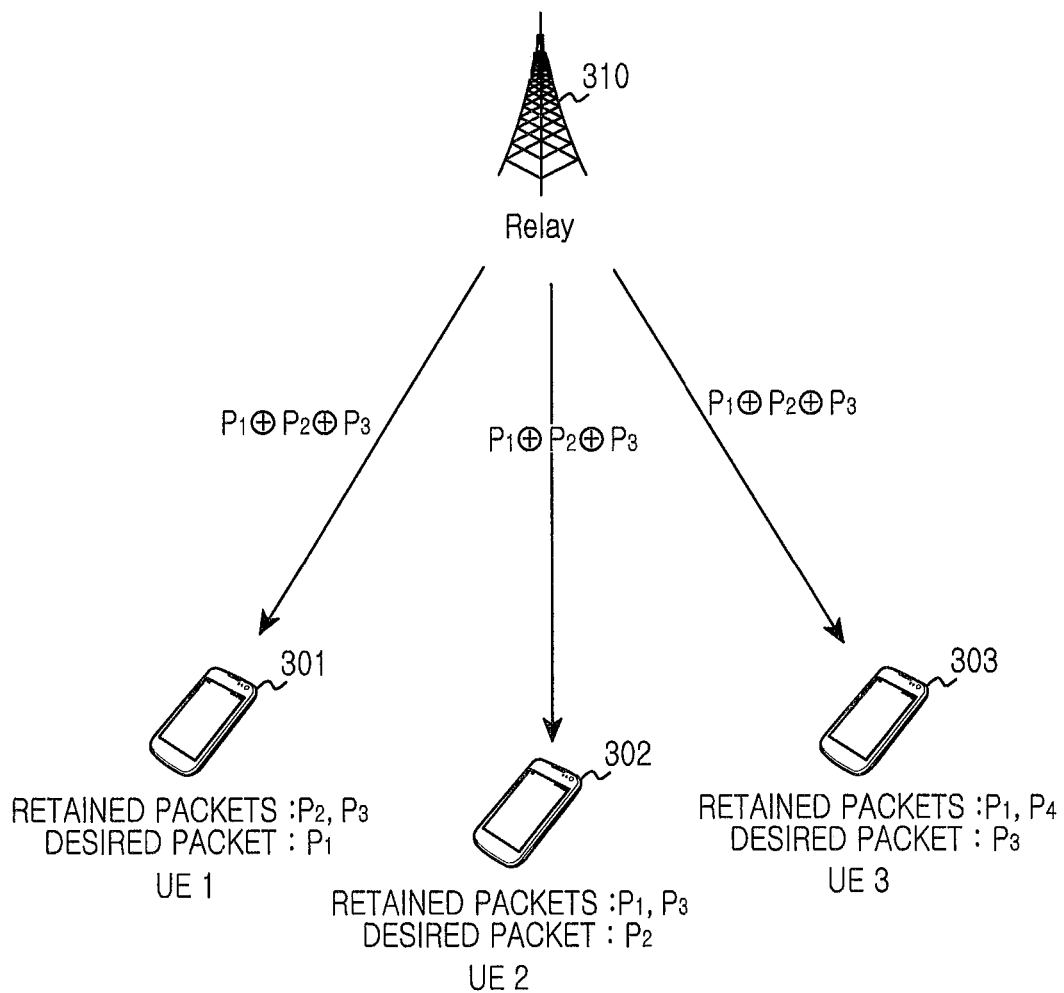
FIG. 3A and FIG. 3B illustrate an example in which a UE acquires a desired packet by using a Not decodable and Undesirable Packet (NUP) in a system supporting network coding according to an embodiment of the present disclosure.
Figure 3B:
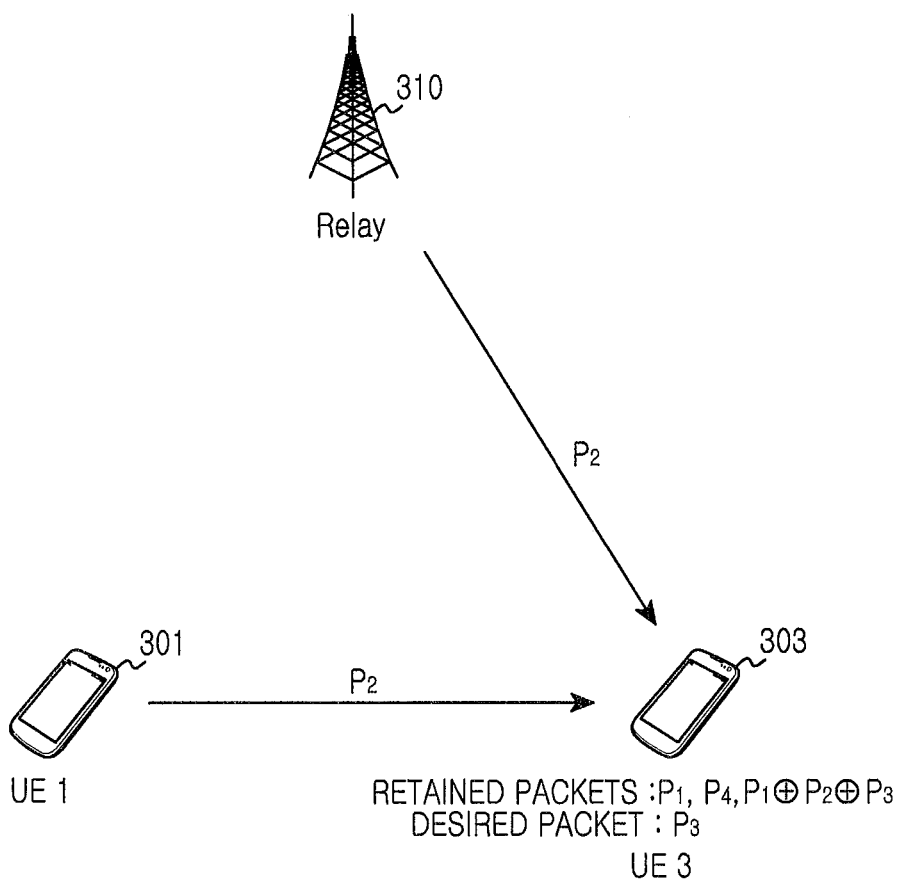

FIG. 3A and FIG. 3B illustrate an example in which a UE acquires a desired packet by using an NUP in a system supporting network coding according to an embodiment of the present disclosure.

As illustrated in FIG. 3A, it is assumed a case where a UE #1 301 retains packets P2 and P3 and requires a packet P1, a UE #2 302 retains packets P1 and P3 and requires a packet P2, and a UE #3 303 retains packets P1 and P4 and requires a packet P3. In this case, a relay 310 can generate P1⊕P2⊕P3 by applying an XOR operation to the packets P1, P2, and P3, and can broadcast the generated NC packets P1⊕P2⊕P3. In this case, the UE #1 301 can extract the desired packet P1 from the received NC packet on the basis of the retained packets P2 and P3, and can store the extracted packet P1 into an original buffer. In addition, the UE #2 302 can extract the desired packet P2 from the received NC packet on the basis of the retained packets P1 and P3, and can store the extracted packet P2 into an original buffer. On the other hand, the UE #3 303 cannot decode the received NC packet by using the retained packets P1 and P4. In this case, the UE #3 303 can store the NC packet P1⊕P2⊕P3, which is a non-decodable packet, into an NUP buffer instead of discarding the packet. This is because, as illustrated in FIG. 3B, if a packet P2 is received from the relay 310 or any other relays or the different UE #1 301 at a later time, a desired packet P3 can be extracted from the NC packet P1⊕P2⊕P3 stored in the NUP buffer by using the received packet P2 and a pre-retained packet P1.

As described above, in the present disclosure, a UE additionally includes an NUP buffer for storing an undesired packet and a DUP buffer for storing a non-decodable NC packet in addition to an original buffer for storing packets required for an operation of the UE. Therefore, a desired packet can be acquired on the basis of the NUP buffer, the DUP buffer, and packets received at a later time.

Figure 4:
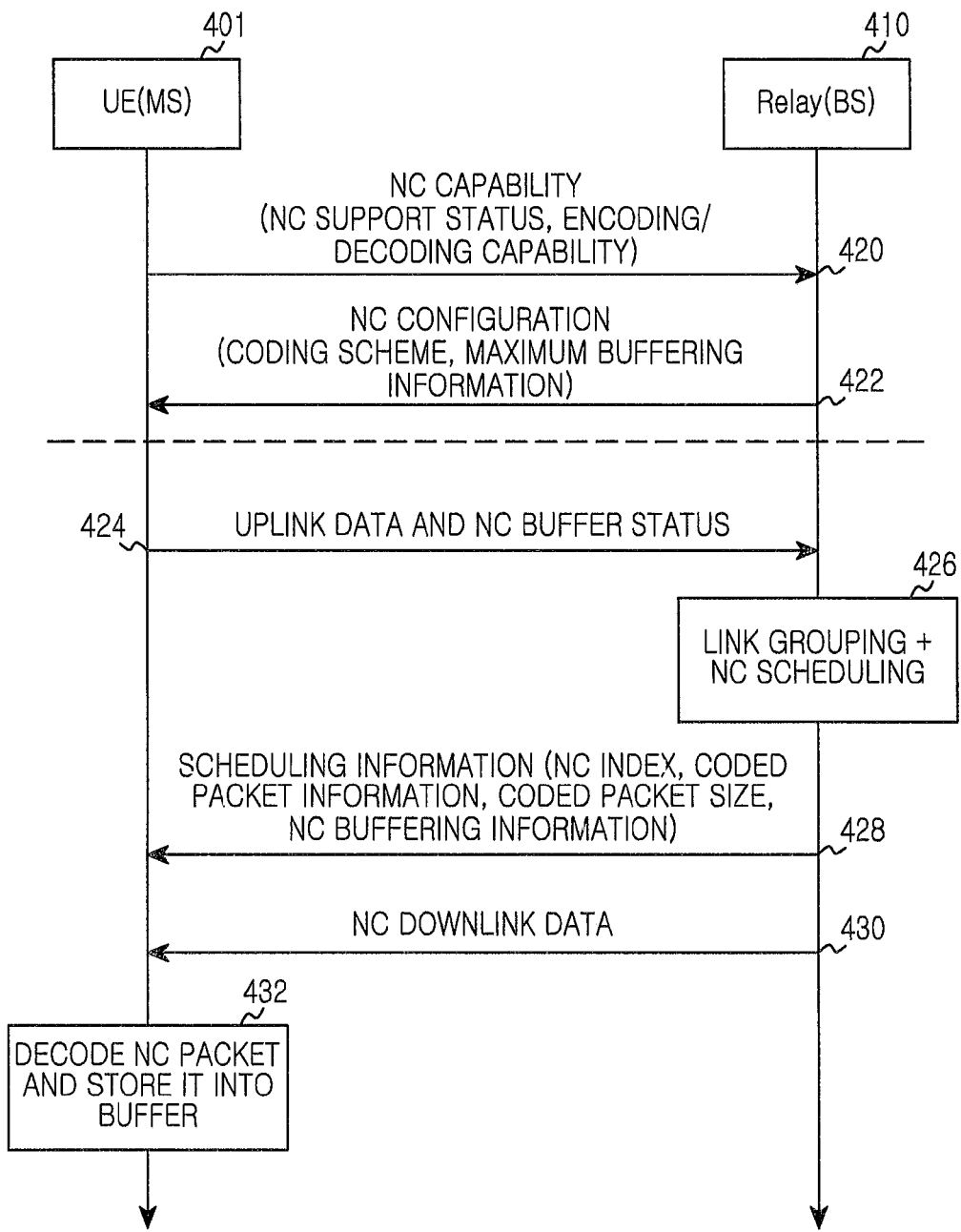
FIG. 4 illustrates a signal flow in a system supporting network coding according to an embodiment of the present disclosure.

FIG. 4 illustrates a signal flow in a system supporting network coding according to an embodiment of the present disclosure.

Referring to FIG. 4, a UE 401 transmits information related to NC capability to a relay (or a BS) 410 in step 420. In this case, the information related to the NC capability can include NC support status information indicating whether the UE supports the network coding scheme and encoding/decoding capability information indicating supported encoding/decoding schemes.

In step 422, the relay 410 generates NC configuration information on the basis of the NC capability information received from the UE 401, and transmits the generated NC configuration information to the UE 410, thereby establishing a connection between the relay 410 and the UE 401. Herein, the NC configuration information can include a coding scheme and maximum buffering information. The coding scheme can be selected from the encoding/decoding schemes supported by the UE, and can be any one of an XOR operation, an addition operation, a multiplication operation, a linear operation, and a nonlinear operation. The maximum buffering information can indicate a maximum time during which the UE 401 must store a corresponding packet as to the packet transmitted by the relay 410.

In step 424, the UE 401 transmits uplink data and NC buffer status information to the relay 410. In this case, the NC buffer status information can include information indicating a size, usage rate, and/or stored packet for each of at least one buffer among an original buffer, a DUP buffer, and an NUP buffer.

In step 426, the relay 410 performs link grouping and NC scheduling on the basis of the uplink data and NC buffer status information received from the UE 401. That is, the relay 410 can estimate a channel state (e.g., a Channel Quality Indicator (CQI)) for each UE on the basis of the uplink data received from a plurality of UEs, and can classify the plurality of UEs into a plurality of groups on the basis of the estimated channel state. In this case, the relay 410 can determine UEs having a similar channel state into one group. This is to improve transmission efficiency by grouping links having a similar transmission rate. In addition, the relay 410 can generate NC packets by encoding data packets for the UEs in each group according to a pre-set coding scheme.

Figure 5:
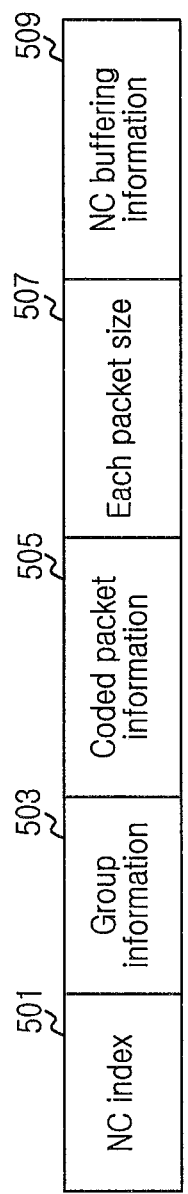
FIG. 5 illustrates a structure of a scheduling information packet regarding a packet to which network coding is applied in a system supporting the network coding according to an embodiment of the present disclosure.

In step 428, the relay 410 generates scheduling information for the NC packet generated for each group, and transmits the generated scheduling information to the UE 401. In this case, as illustrated in FIG. 5, the scheduling information can include an NC index 501, group information 503, coded packet information 505, a coded packet size 507, and NC buffering information 509. The NC index 501 indicates whether a corresponding packet is a packet to which the network coding is applied or a packet to which the network coding is not applied. The group information 503 indicates a specific link group to which the UE belongs. In addition, the coded packet information 505 can indicate specific packets from which the NC packet is encoded, and the size 507 of each packet can indicate a size of each packet participating in encoding. In addition, when the UE stores a corresponding packet into an NUP buffer or a DUP buffer, the NC buffering information 509 can indicate a specific period of time during which the packet is stored without being discarded. In addition, the NC buffering information 509 can indicate whether a corresponding packet is to be retransmitted last, that is, whether there is no more possibility that the packet is retransmitted. In addition, the NC buffering information 509 can indicate whether other UEs in the same group successfully receive a certain packet. Herein, a packet which is no longer transmitted can be determined by using information indicating whether the other UEs in the same group successfully receive the certain packet.

In step 430, the relay 401 transmits an NC packet generated for each group. Thereafter, the UE 403 stores the NC buffer by decoding the received NC packet. In this case, the NC buffer can include the original buffer, the DUP buffer, or the NUP buffer. For example, if the received NC packet is decodable on the basis of packets stored in the original buffer or the DUP buffer, the UE 403 can decode the NC packet to extract a desired packet or an undesired packet. The UE 430 can store the extracted packet into the original buffer if the desired packet is extracted, or can store the extracted packet into the DUP packet if undesired packet is extracted. In this case, if there is a packet extracted from NC packets pre-stored in the DUP buffer and an NC packet which is decodable by using the pre-stored packets, the UE 403 can decode the NC packet to extract a desired packet or an undesired packet. In addition, if the received NC packet is not decodable on the basis of the packets stored in the original buffer or the DUP buffer, the UE 430 can store the received NC packet into the NUP buffer.

Figure 6:
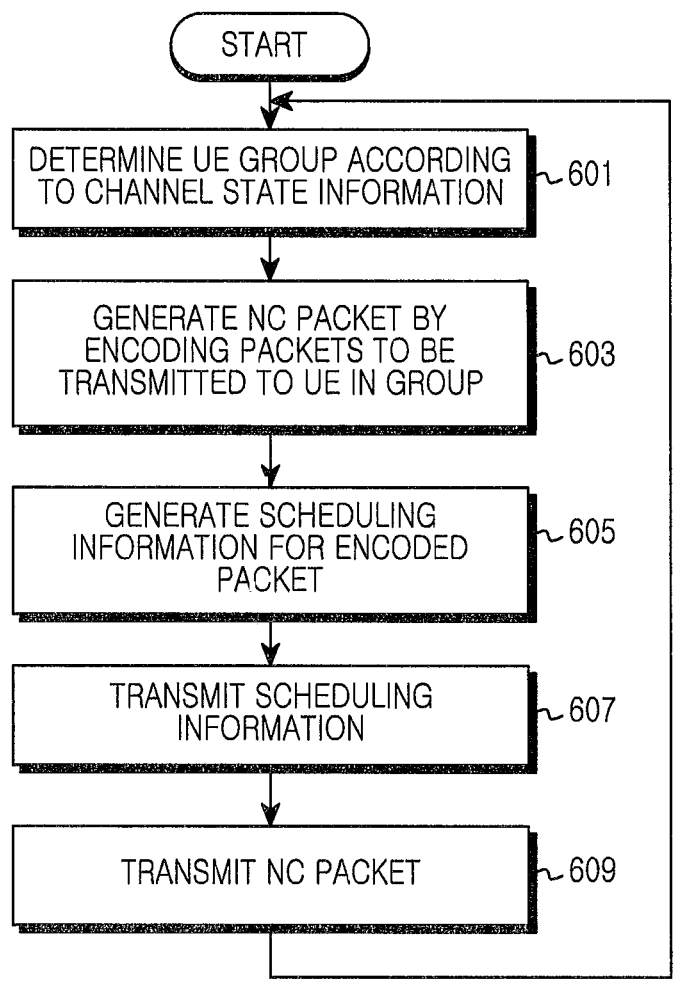
FIG. 6 is a flowchart illustrating an operation of a relay in a system supporting network coding according to an embodiment of the present disclosure.

FIG. 6 is a flowchart illustrating an operation of a relay in a system supporting network coding according to an embodiment of the present disclosure.

Referring to FIG. 6, the relay determines a UE group on the basis of a channel state in step 601. In this case, the relay can determine UEs having a similar channel state to one group among a plurality of UEs. In step 603, the relay encodes packets to be transmitted to the UEs included in the same group according to a pre-set scheme. For example, if a UE 1 and a UE 2 are a first group, and a UE 3 and a UE 4 are a second group, the relay can generate an NC packet P1⊕P2 by encoding a packet P1 to be transmitted to the UE 1 and a packet P2 to be transmitted to the UE 2 on the basis of a pre-set encoding scheme, and can generate an NC packet P3⊕P4 by encoding a packet P3 to be transmitted to the UE 3 and a packet P4 to be transmitted to the UE 4 on the basis of a pre-set encoding scheme.

The relay generates scheduling information for the encoded NC packet in step 605, and thereafter transmits the scheduling information in step 607. In this case, as illustrated in FIG. 5, the scheduling information can include the NC index 501, the group information 503, the coded packet information 505, the coded packet size 507, and the NC buffering information 509.

In step 609, the relay transmits the encoded NC packet. Thereafter, returning to step 601, the relay can repeat the subsequent steps. In addition, according to the exemplary embodiment, returning to step 603, the relay can repeat the subsequent steps.

Figure 7:
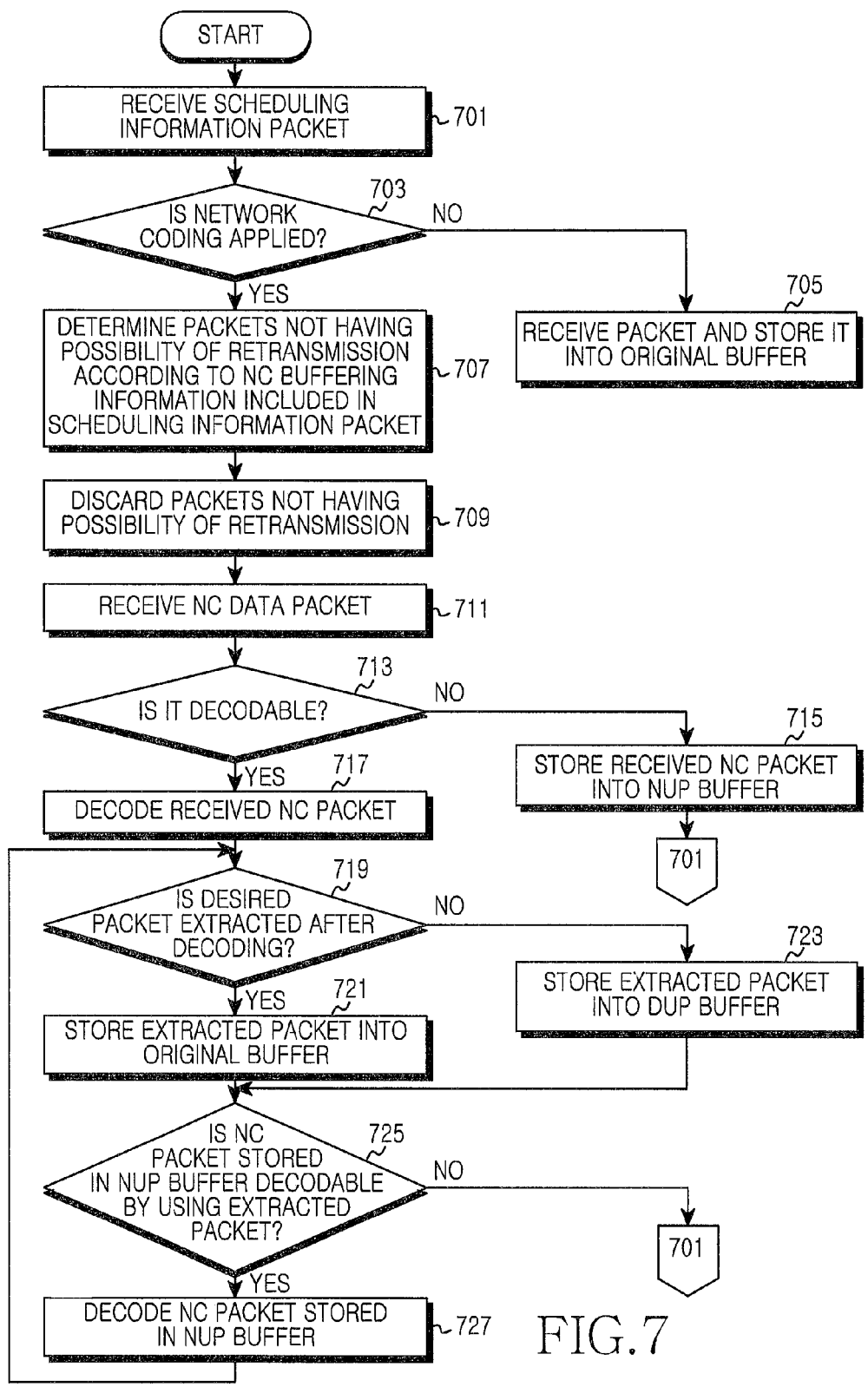
FIG. 7 is a flowchart illustrating an operation of a UE in a system supporting network coding according to an embodiment of the present disclosure.

FIG. 7 is a flowchart illustrating an operation of a UE in a system supporting network coding according to an embodiment of the present disclosure.

Referring to FIG. 7, the UE receives a scheduling information packet from a relay in step 701. In this case, as illustrated in FIG. 5, the scheduling information can include the NC index 501, the group information 503, the coded packet information 505, the coded packet size 507, and the NC buffering information 509.

In step 703, the UE confirms whether a downlink packet to be received is a packet to which the network coding is applied, on the basis of an NC index included in the scheduling information packet. If the packet is a packet to which the network coding is not applied, proceeding to step 705, the UE receives downlink packet data, and stores the received packet into an original buffer.

Otherwise, if the packet is the packet to which the network coding is applied, proceeding to step 707, the UE determines packets not having a possibility of retransmission, on the basis of NC buffering information included in the scheduling information packet. That is, the UE determines packets not having a possibility of retransmission at a later time, by analyzing information indicating whether a corresponding packet is to be retransmitted last and/or information indicating whether other UEs in the same group successfully receive a certain packet. Herein, the UE can confirm packets used for encoding of a corresponding NC packet from the coded packet information 505 included in the scheduling information, and can determine whether each of packets used for encoding of the NC packet has or has not the possibility of retransmission at a later time on the basis of NC buffering information.

In step 709, the UE discards packets determined not to have the possibility of retransmission. That is, when there is a packet determined not to have the possibility of retransmission is stored in an NC buffer, the UE can discard the packet. This is because there is no possibility that the packet is used for decoding of another packet since the packet is not retransmitted at a later time.

The UE receives a network-coded (NC) packet in step 711, and confirms whether the received NC packet is decodable in step 713. In this case, the UE can confirm packets used in encoding of the NC packet on the basis of the coded packet information included in the scheduling information, and can determine whether the NC packet is decodable by comparing the packets used in the encoding of the NC packet and packets retained in the UE. For example, the UE can determine that the NC packet is decodable when the remaining all packets other than specific one packet are retained among the packets used in the encoding of the NC packet. Otherwise, if at least two or more packets are not retained among the packets used in the encoding of the NC packet, the UE can determine that the NC packet is not decodable.

Figure 8:
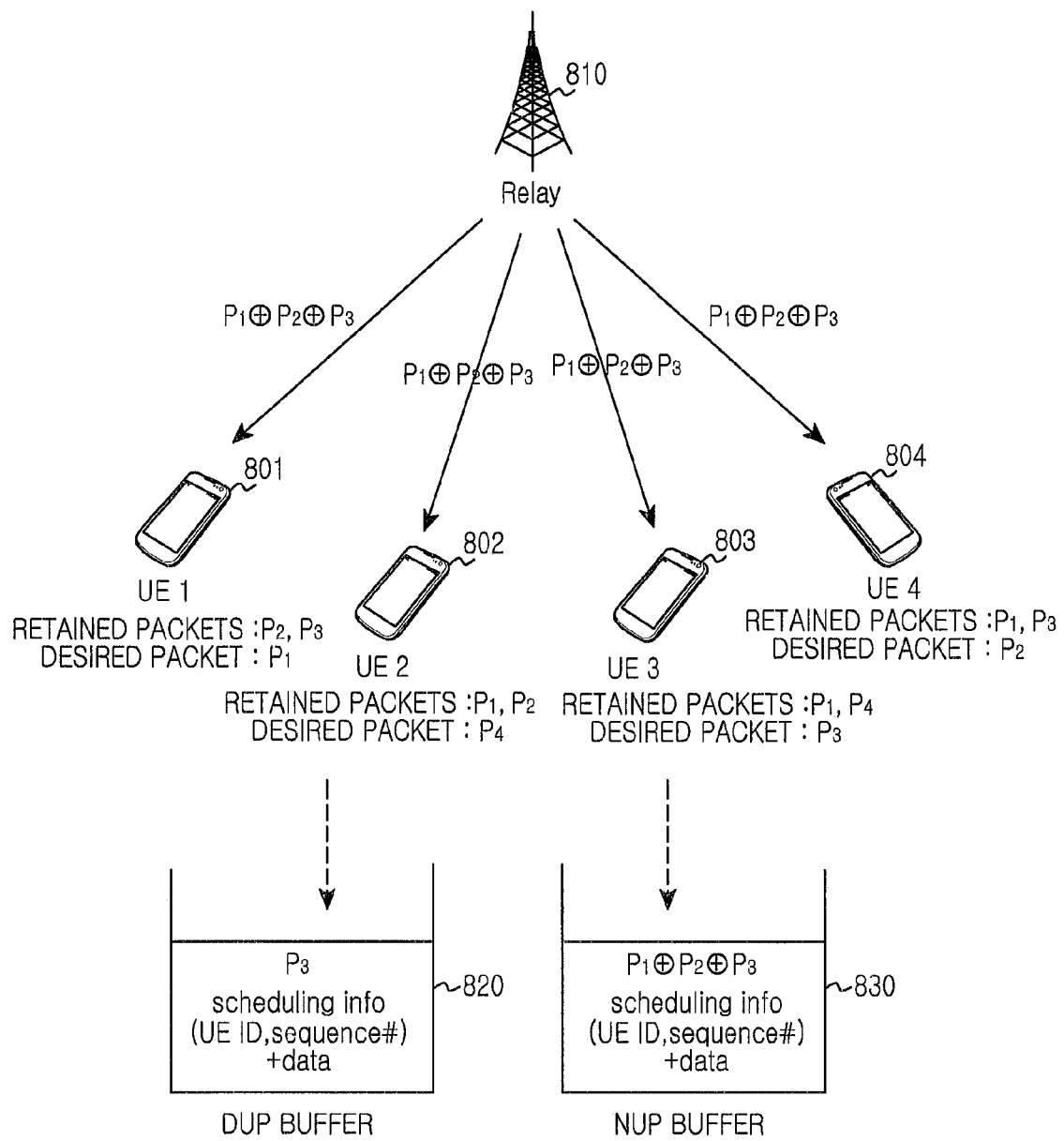
FIG. 8 illustrates an example of operating a NUP buffer and a DUP buffer in a system supporting network coding according to an embodiment of the present disclosure.

If it is determined that the received NC packet is not decodable, the UE stores the received NC packet into the NUP buffer in step 715, and then returning to step 701, can repeat the subsequent steps. For example, as illustrated in FIG. 8, if a UE #3 803 retains packets P1 and P4, and receives an NC packet P1⊕P2⊕P3 from a relay 810 when it is desired to receive a packet P3, the UE #3 803 cannot decode the NC packet. Therefore, the UE #3 803 can store the received NC packet P1⊕P2⊕P3 into an NUP buffer.

Otherwise, if it is determined that the received NC packet is decodable, the UE can decode the received NC packet in step 717. In this case, the UE can use packets included in an original buffer and/or a DUP buffer.

In step 719, the UE decodes the NC packet and examines whether an extracted packet is a desired packet. If the desired packet is extracted, the UE stores the extracted packet into the original buffer in step 721. For example, as illustrated in FIG. 8, if a UE #1 801 retains packets P2 and P3, and receives an NC packet P1⊕P2⊕P3 from the relay 810 when it is desired to receive a packet P1, the UE #1 801 can decode the NC packet to extract the packet P1, and can store the extracted packet P1 into the original buffer. For another example, as illustrated in FIG. 8, if a UE #4 804 retains packets P1 and P3, and receives an NC packet P1⊕P2⊕P3 from the relay 810 when it is desired to receive a packet P2, the UE #4 804 can decode the NC packet to extract the packet P2, and can store the extracted packet P2 into the original buffer.

Otherwise, if an undesired packet is extracted, the UE stores the extracted packet into the DUP buffer in step 723. For example, as illustrated in FIG. 8, if a UE #2 802 retains packets P1 and P2, and receives an NC packet P1⊕P2⊕P3 from the relay 810 when it is desired to receive a packet P4, the UE #2 802 can decode the NC packet to extract the packet P3, and can store the extracted packet P3 into the original buffer. However, the UE #2 802 can store the extracted packet P3 into the DUP buffer since the packet P3 is not required at a current time. The packet stored in the DUP buffer is a packet not required for a transmission/reception operation of the UE at the current time. Therefore, when the packet stored in the DUP buffer is required for the transmission/reception operation of the UE at a later time, the UE can store the packet into the original buffer by moving from the DUP buffer.

In step 725, the UE confirms whether the NC packet stored in the NUP buffer is decodable by using the extracted packet. In this case, the UE can confirm whether the NC packet stored in the NUP buffer is decodable by using the extracted packet and a packet pre-stored in the original buffer and/or the DUP buffer. If the NC packet stored in the NUP buffer is decodable by using the extracted packet, the UE decodes the NC packet stored in the NUP buffer in step 727, and returning to step 719, repeats the subsequent steps. In this case, the UE can discard the NC packet from the NUP buffer.

Otherwise, if the NC packet stored in the NUP buffer is not decodable by using the extracted packet, returning to step 701, the UE can repeat the subsequent steps.

In FIG. 7 described above, packets stored in the original buffer, the DUP buffer, and/or the NUP buffer can be discarded on the basis of the NC buffering information included in the scheduling information received from the relay. That is, if each packet is stored in the NUP buffer or the DUP buffer on the basis of the NC buffering information included in the scheduling information, the UE can confirm a specific period of time during which a corresponding packet is stored without being discarded, and if the time expires, can discard the packet from the NUP buffer or the DUP buffer.

Figure 9:
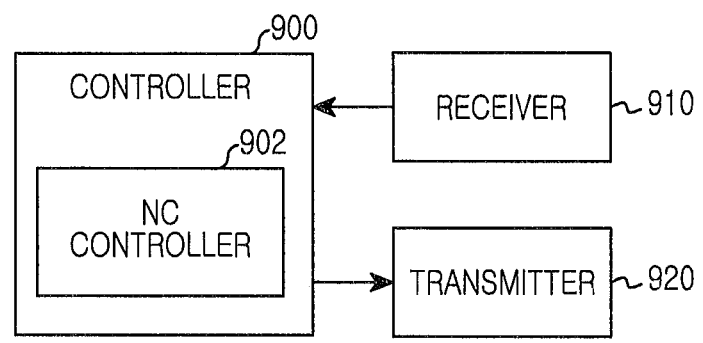
FIG. 9 is a block diagram illustrating a structure of a relay in a system supporting network coding according to an embodiment of the present disclosure.

FIG. 9 is a block diagram illustrating a structure of a relay in a system supporting network coding according to an embodiment of the present disclosure.

Referring to FIG. 9, the relay includes a controller 900, a receiver 910, and a transmitter 920.

The controller 900 controls and processes a function for delivering to a corresponding UE a packet received from each UE. In particular, the controller 900 includes an NC controller 902 to control and process a function for transmitting a packet received from a plurality of UEs by applying a network coding scheme. That is, the NC controller 902 determines a UE group on the basis of a channel state for a plurality of currently accessed UEs. In this case, the NC controller 902 can determine UEs having a similar channel state to one group among the plurality of UEs. For example, the NC controller 902 can determine a group for each UE on the basis of a CQI value. The NC controller 902 controls the transmitter 920 to control and process a function for encoding packets to be transmitted to UEs included in the same group on the basis of a pre-set scheme. For example, if a UE 1 and a UE 2 are a first group, and a UE 3 and a UE 4 are a second group, the relay controls and processes a function for generating an NC packet P1⊕P2 by encoding a packet P1 to be transmitted to the UE 1 and a packet P2 to be transmitted to the UE 2 on the basis of a pre-set encoding scheme and for generating an NC packet P3⊕P4 by encoding a packet P3 to be transmitted to the UE 3 and a packet P4 to be transmitted to the UE 4 on the basis of a pre-set encoding scheme. The NC controller 902 controls and processes a function for generating scheduling information for the encoded NC packet and for transmitting the scheduling information and the encoded NC packet. In this case, as illustrated in FIG. 5, the scheduling information can include the NC index 501, the group information 503, the coded packet information 505, the coded packet size 507, and the NC buffering information 509.

The receiver 910 receives a packet from at least one UE and provides it to the controller 900. The receiver 910 can estimate a channel state for each UE on the basis of a signal received from each UE.

The transmitter 920 performs a function for generating an NC packet under the control of the NC controller 902 and for transmitting the generated NC packet to at least one UE. That is, the transmitter 920 generates the NC packet by applying a network coding scheme to at least two packets provided from the controller 900. Herein, the network coding scheme can be any one of an XOR operation, an addition operation, a multiplication operation, a linear operation, and a nonlinear operation.

Figure 10:
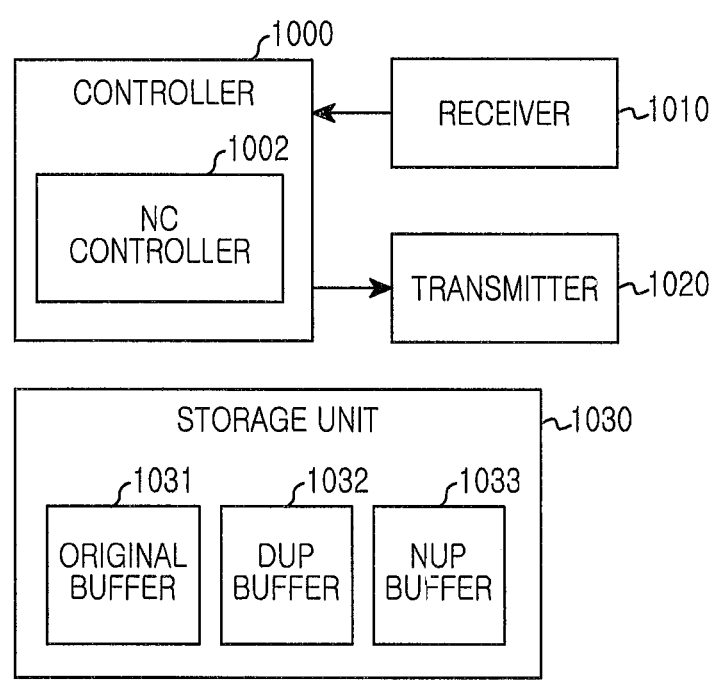
FIG. 10 is a block diagram illustrating a structure of a UE in a system supporting network coding according to an embodiment of the present disclosure.

FIG. 10 is a block diagram illustrating a structure of a UE in a system supporting network coding according to an embodiment of the present.

Referring to FIG. 10, the UE includes a controller 1000, a receiver 1010, a transmitter 1020, and a storage unit 1030.

The controller 1000 controls and processes an overall operation of the UE. In particular, an NC controller 1002 controls and processes a function for processing an NC packet received from a relay via the receiver 1020. That is, the NC controller 1002 confirms whether a downlink packet to be received is a packet to which the network coding is applied, on the basis of an NC index included in a scheduling information packet from the relay. If the downlink packet to be received is a packet to which the network coding is not applied, the NC controller 1002 receives corresponding downlink packet data, and stores the received packet into an original buffer 1031 of the storage unit. If the downlink packet to be received is a packet to which the network coding is applied, the NC controller 1002 determines packets not having a possibility of retransmission, on the basis of NC buffering information included in the scheduling information packet. That is, the NC controller 1002 uses the NC buffering information to determine packets not having a possibility of retransmission at a later time, by analyzing information indicating whether a corresponding packet is to be retransmitted last and/or information indicating whether other UEs in the same group successfully receive a certain packet. Herein, the NC controller 1002 can confirm packets used for encoding of a corresponding NC packet from coded packet information included in scheduling information, and can determine whether each of packets used for encoding of the NC packet has or has not a possibility of retransmission at a later time on the basis of NC buffering information. The NC controller 1002 can discard packets determined not to have a possibility of retransmission. That is, when there is a packet determined not to have the possibility of retransmission is stored in the storage unit 1030, the NC controller 1002 can discard the packet. This is because there is no possibility that the packet is used for decoding of another packet since the packet is not retransmitted at a later time.

The NC controller 1002 confirms whether an NC packet received via the receiver 1010 is decodable. In this case, the NC controller 1002 can confirm packets used in encoding of the NC packet on the basis of coded packet information included in the scheduling information, and can determine whether the NC packet is decodable by comparing the packets used in the encoding of the NC packet and packets retained in the UE. For example, the NC controller 1002 can determine that the NC packet is decodable when the remaining all packets other than specific one packet are retained among the packets used in the encoding of the NC packet. Otherwise, if at least two or more packets are not retained among the packets used in the encoding of the NC packet, the NC controller 1002 can determine that the NC packet is not decodable.

When it is determined that the received NC packet is not decodable, the NC controller 1002 can store the received NC packet into an NUP buffer 1033 of the storage unit 1030. For example, as illustrated in FIG. 8, if the NC packet P1⊕P2⊕P3 is received from the relay 810 when the packets P1 and P4 are pre-stored in the original buffer 1030 and/or a DUP buffer 1032 of the storage unit 1030 and when it is desired to receive the packet P3, since the NC controller 1002 cannot decode the NC packet, the received NC packet P1⊕P2⊕P3 can be stored in the NUP buffer 1033.

When it is determined that the received NC packet is decodable, the NC controller 1002 can decode the received NC packet. In this case, the NC controller 1002 can decode the NC packet by using the packets included in the original buffer 1031 and/or the DUP buffer 1032.

The NC controller 1002 can decode the NC packet and examine whether an extracted packet is a desired packet, and if the desired packet is extracted, can store the extracted packet into the original buffer 1031. For example, as illustrated in FIG. 8, if the NC packet P1⊕P2⊕P3 is received from the relay 810 when the packets P2 and P3 are pre-stored in the original buffer 1031 and/or the DUP buffer 1032 of the storage unit 1030 and when it is desired to receive the packet P1, the NC controller 1002 can control the receiver 1010 to extract the packet P1 by decoding the NC packet, and can store the extracted packet P1 into the original buffer 1031. For another example, as illustrated in FIG. 8, if the NC packet P1⊕P2⊕P3 is received from the relay 810 when the packets P1 and P3 are pre-stored in the original buffer 1031 and/or the DUP buffer 1032 of the storage unit 1030 and when it is desired to receive the packet P2, the NC controller 1002 can control the receiver 1010 to extract the packet P2 by decoding the NC packet, and can store the extracted packet P2 into the original buffer 1031.

In addition, if an undesired packet is extracted, the NC controller 1002 can store the extracted packet into the DUP buffer 1032. For example, as illustrated in FIG. 8, if the NC packet P1⊕P2⊕P3 is received from the relay 810 when the packets P1 and P2 are pre-stored in the original buffer 1031 and/or the DUP buffer 1032 of the storage unit 1030 and when it is desired to receive the packet P4, the NC controller 1002 can control the receiver 1010 to extract the packet P3 by decoding the NC packet. In this case, since the packet P3 is not necessary at a current time, the NC controller 1002 can store the extracted packet P3 into the DUP buffer 1032.

In addition, the NC controller 1002 confirms whether the NC packet stored in the NUP buffer 1033 is decodable, by using the extracted packet. In this case, the UE can confirm whether the NC packet stored in the NUP buffer 1033 is decodable, by using the extracted packet and a packet pre-stored in the original buffer 1031 and/or the DUP buffer 1032. If the NC packet stored in the NUP buffer 1033 is decodable by using the extracted packet, the NC controller 1002 can decode the NC packet stored in the NUP buffer 1033, and can discard the decoded NC packet from the NUP buffer 1033.

In addition, the NC controller 1002 can discard packets stored in the original buffer 1031, the DUP buffer 1032, and/or the NUP buffer 1033 on the basis of NC buffering information included in scheduling information received from the relay. That is, if each packet is stored in the NUP buffer 1033 or the DUP buffer 1032 on the basis of the NC buffering information included in the scheduling information, the NC controller 1002 can confirm a specific period of time during which a corresponding packet is stored without being discarded, and if the time expires, can discard the packet from the NUP buffer 1033 or the DUP buffer 1032.

The receiver 1010 receives a packet from the relay and provides the packet to the controller 1010. The receiver 1010 controls and processes a function for decoding a received NC packet under the control of the controller 1010 according to a network coding scheme. Herein, the network coding scheme can be any one of an XOR operation, an addition operation, a multiplication operation, a linear operation, and a nonlinear operation.

The transmitter 1020 performs a function for transmitting a packet to a peer UE via the relay.

The storage unit 1030 stores a variety of data and programs required for an operation of the UE. In particular, the storage unit 1030 includes the original buffer 1031, the DUP buffer 1032, and the NUP buffer 1032. The original buffer 1031 stores a packet required for the operation of the UE. The DUP buffer 1032 stores a packet which is not required for the operation of the UE but which is decodable. In addition, the NUP buffer 1033 stores a packet which is not required for the operation of the UE and which is not decodable. Herein, the packet stored in the DUP buffer 1032 is a packet not required for a transmission/reception operation of the UE at a current time. When the packet stored in the DUP buffer 1032 is required for the transmission/reception operation of the UE at a later time, the packet can be stored in the original buffer 1031 by moving from the DUP buffer 1032.

According to an embodiment of the present disclosure, in a system supporting network coding, a UE stores an undesired packet into a DUP buffer by extracting the undesired packet from received decodable packets, and stores a received non-decodable packet into an NUP buffer by classifying the received non-decodable packet, so that a desired packet can be extracted by using another packet received at a later time, the packet stored in the DUP buffer, and/or the packet stored in the NUP buffer. In addition, according to the embodiment of the present disclosure, resource utilization of an overall system can be improved while reducing a decrease in network efficiency when the non-decodable packet is received.

While the present disclosure has been particularly shown and described with reference to exemplary embodiments thereof, it will be understood by those skilled in the art that various modifications and changes in form and details can be made therein without departing from the spirit of the disclosure. A program instruction for performing an operation implemented with various computers can be recorded in a computer readable recording medium according to an exemplary embodiment of the present disclosure. The computer readable recording medium can include a program instruction, a data file, a data structure, etc., in an independent or combined manner. The program instruction can be designed and configured particularly for the present disclosure, or can be known and usable to those ordinarily skilled in the art. The computer readable recording medium can be a hardware device configured particularly to store and perform a program instruction, for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler but also a high-level language executable by a computer by using an interpreter or the like. When a BS or a relay described in the present disclosure is entirely or partially implemented with a computer program, a computer readable recording medium which stores the computer program is also included in the present disclosure. Therefore, the scope of the disclosure is defined not by the detailed description of the disclosure but by the appended claims, and all differences within the scope will be construed as being included in the present disclosure.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method in which a User Equipment (UE) manages a packet in a system supporting network coding, the method comprising:
   receiving, from a relay, information on a packet to which the network coding is applied;
   receiving, from the relay, the packet to which the network coding is applied;
   confirming whether a packet required for an operation of the UE can be acquired from the received packet on the basis of information on the packet to which the network coding is applied; and
   storing packets into different buffers by distinguishing between the packet required for the operation of the UE and a packet not required for the operation of the UE.

2. The method of claim 1, wherein the information on the packet to which the network coding is applied comprises:
   at least one of an index indicating whether the network coding is applied to the packet;
   a UE group corresponding to a packet participating in the network coding;
   information indicating the packet participating in the network coding; information indicating a size of the packet participating in the network coding; a time for storing each buffer of the packet;
   information indicating whether the packet is to be retransmitted last; and information indicating a packet which is successfully received by UEs in the same group.

3. The method of claim 1, wherein the packet not required for the operation of the UE includes at least one of a packet which is decodable and is not required by the UE and a packet which is not decodable and is not required by the UE.

4. The method of claim 3, wherein the storing of the packets into the different buffers by distinguishing between the packet required for the operation of the UE and the packet not required for the operation of the UE comprises:
   determining whether the received packet is decoded on the basis of the information on the packet to which the network coding is applied and a packet pre-stored in at least one buffer of the UE;
   if the received packet is decodable, acquiring any one of a packet required for the operation of the UE and a packet not required for the operation of the UE by decoding the received packet; and
   if the packet required for the operation of the UE is acquired, storing the acquired packet into a first buffer, and if the packet not required for the operation of the UE is acquired, storing the acquired packet into a second buffer.

5. The method of claim 4, further comprising, if the received packet is not decodable, storing the received packet into a third buffer.

6. The method of claim 5, further comprising:
   confirming whether a packet pre-stored in the third buffer is decodable on the basis of the packet stored in the first buffer or the second buffer;
   if the packet pre-stored in the third buffer is decodable, acquiring any one of the packet required for the operation of the UE and the packet not required for the operation of the UE by decoding the packet pre-stored in the third buffer;
   if the packet required for the operation of the UE is acquired, storing the acquired packet into the first buffer, and if the packet not required for the operation of the UE is acquired, storing the acquired packet into the second buffer; and
   discarding the decoded packet from the third buffer.

7. The method of claim 1, further comprising:
   determining packets having no possibility of retransmission at a later time on the basis of the information on the packet to which the network coding is applied; and
   discarding the determining packets from at least one buffer of the UE.

8. The method of claim 1, further comprising:
   determining a time for storing each packet stored in at least one buffer of the UE on the basis of the information on the packet to which the network coding is applied; and
   if the time for storing the packet expires, discarding a corresponding packet from a corresponding buffer.

9. An apparatus for managing a packet in a system supporting network coding, the apparatus comprising:
   a receiver configured to receive, from a relay, information on a packet to which the network coding is applied and the packet to which the network coding is applied;
   a controller configured to confirm whether a packet required for an operation of the UE can be acquired from the received packet on the basis of information on the packet to which the network coding is applied; and
   a memory configured to store packets under the control of the controller into different buffers by distinguishing between the packet required for the operation of the UE and a packet not required for the operation of the UE.

10. The apparatus of claim 9, wherein the information on the packet to which the network coding is applied comprises:
    at least one of an index indicating whether the network coding is applied to the packet,
    a UE group corresponding to a packet participating in the network coding, information indicating the packet participating in the network coding,
    information indicating a size of the packet participating in the network coding, a time for storing each buffer of the packet, information indicating whether the packet is to be retransmitted last, and
    information indicating a packet which is successfully received by UEs in the same group.

11. The apparatus of claim 9, wherein the packet not required for the operation of the UE includes at least one of a packet which is decodable and is not required by the UE and a packet which is not decodable and is not required by the UE.

12. The apparatus of claim 11, wherein the controller is configured to:
    determine whether the received packet is decoded on the basis of the information on the packet to which the network coding is applied and a packet pre-stored in at least one buffer of the UE, and
    if the received packet is decodable, acquire any one of a packet required for the operation of the UE and a packet not required for the operation of the UE by decoding the received packet, and
    wherein the memory comprises:
        a first buffer configured to store a packet required for the operation of the UE under the control of the controller, and
        a second buffer configured to store a packet not required for the operation of the UE.

13. The apparatus of claim 12, wherein the memory further includes a third buffer configured to store a received non-decodable packet.

14. The apparatus of claim 13, wherein the controller is configured to:
- confirm whether a packet pre-stored in the third buffer is decodable on the basis of the packet stored in the first buffer or the second buffer;
- if the packet pre-stored in the third buffer is decodable, acquire any one of the packet required for the operation of the UE and the packet not required for the operation of the UE by decoding the packet pre-stored in the third buffer;
- if the packet required for the operation of the UE is acquired, store the acquired packet into the first buffer;
- if the packet not required for the operation of the UE is acquired, store the acquired packet into the second buffer, and
- discard the decoded packet from the third buffer.

15. The apparatus of claim 9, wherein the controller is configured to determine packets having no possibility of retransmission at a later time on the basis of the information on the packet to which the network coding is applied, and discards the determining packets from at least one buffer of the UE.

16. The apparatus of claim 9, wherein the controller is configured to:
- determine a time for storing each packet stored in at least one buffer of the UE on the basis of the information on the packet to which the network coding is applied, and
- if the time for storing the packet expires, discard a corresponding packet from a corresponding buffer.

* * * * *